(12) United States Patent
Chang et al.

(10) Patent No.: US 10,486,782 B2
(45) Date of Patent: Nov. 26, 2019

(54) CARRYING DEVICE AND OPERATION METHOD THEREOF

(71) Applicant: Industrial Technology Research Institute, Hsinchu (TW)

(72) Inventors: Yu-Chi Chang, Hsinchu (TW); Yi-Chen Li, Hsinchu (TW); Shih-Sheng Hsu, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 15/850,199

(22) Filed: Dec. 21, 2017

(65) Prior Publication Data
US 2019/0144088 A1    May 16, 2019

(30) Foreign Application Priority Data

Nov. 10, 2017    (TW) .............................. 106138964 A

(51) Int. Cl.
*B63B 35/44*    (2006.01)
*B63B 43/02*    (2006.01)

(52) U.S. Cl.
CPC .............. *B63B 43/02* (2013.01); *B63B 35/44* (2013.01); *B63B 2035/4453* (2013.01); *B63B 2231/48* (2013.01)

(58) Field of Classification Search
CPC ................ B63B 35/44; B63B 2035/44; B63B 2035/4453; B63B 43/02; B63B 43/10; B63B 2043/02; B63B 2043/10; B63B 2231/40; B63B 2231/48
USPC ............... 114/256, 264, 266, 267, 294, 295; 441/133; 405/224
See application file for complete search history.

(56) References Cited

U.S. PATENT DOCUMENTS

| | | | | | |
|---|---|---|---|---|---|
| 2,960,832 | A | * | 11/1960 | Hayward | .............. E02B 17/027 |
| | | | | | 114/294 |
| 3,555,831 | A | * | 1/1971 | Pogonowski | ........... E02B 17/00 |
| | | | | | 29/243.518 |
| 3,805,535 | A | * | 4/1974 | Van Weele | ................ E02D 5/38 |
| | | | | | 405/237 |

(Continued)

FOREIGN PATENT DOCUMENTS

| CN | 101538857 A | 9/2009 |
|---|---|---|
| CN | 102493455 A | 6/2012 |

(Continued)

OTHER PUBLICATIONS

"The influence of pull-out load on the efficiency of jetting during spudcan extraction", Britta Bienen, Christophe Gaudin, Mark J. Cassidy, Applied Ocean Research, Mar. 9, 2009 202-211.

(Continued)

*Primary Examiner* — Daniel V Venne
(74) *Attorney, Agent, or Firm* — Mintz Levin Cohn Ferris Glovsky and Popeo, P.C.; Peter F. Corless; Steven M. Jensen

(57) ABSTRACT

The present disclosure provides a carrying device and an operation method thereof. The carrying device includes: a floating platform; and at least one flexible unit provided on a bottom side of the floating plate and having a cavity formed therein. The flexible unit is deformed under a stress to reduce the friction force between the flexible unit and the solid in the water, which allows the carrying device to break free from the solid without external help.

12 Claims, 5 Drawing Sheets

(56) References Cited

U.S. PATENT DOCUMENTS

| | | | |
|---|---|---|---|
| 5,529,013 A | 6/1996 | Eva, III et al. | |
| 6,257,164 B1 | 7/2001 | Carey, II | |
| 6,745,714 B1 | 6/2004 | Faber | |
| 7,325,628 B2 * | 2/2008 | Brunning | B63B 21/26 114/295 |
| 8,136,468 B2 | 3/2012 | Rytand et al. | |
| 9,371,625 B2 | 6/2016 | Foo et al. | |
| 9,387,913 B1 | 7/2016 | Dye | |
| 2012/0325137 A1 * | 12/2012 | Hoefler | B63B 7/06 114/264 |
| 2014/0224165 A1 | 8/2014 | Veloso et al. | |
| 2015/0007872 A1 * | 1/2015 | Cap | E04D 11/005 136/251 |
| 2016/0059938 A1 | 3/2016 | Momayez et al. | |
| 2016/0156304 A1 | 6/2016 | Smadja et al. | |

FOREIGN PATENT DOCUMENTS

| | | |
|---|---|---|
| CN | 102792102 A | 11/2012 |
| CN | 104094520 A | 10/2014 |
| CN | 205105147 U | 3/2016 |
| CN | 205232103 U | 5/2016 |
| CN | 105827189 A | 8/2016 |
| CN | 105897139 A | 8/2016 |
| JP | 2011-238890 A | 11/2011 |
| TW | 489194 | 6/2002 |
| TW | 408023 U | 7/2011 |
| TW | 414567 U | 10/2011 |
| TW | 529829 U | 10/2016 |
| TW | I589487 B | 7/2017 |

OTHER PUBLICATIONS

"Experimental Studies on Behavior of Single Pile under Combined Uplift and Lateral Loading", K. Madhusudan Reddy and R. Ayothiraman, Journal of Geotechnical and Geoenvironmental Engineering, Jan. 30, 2015.

"Wall slope effects on the vertical pull-out capacity of tapered suction caissons", M. Zienoddinia, J. Keyvanib, M. Nabipoura, Scientia Iranica, Apr. 24, 2011 313-325.

"Floating photovoltaic power plant: A review" A. Sahu, N. Yadav, and K. Sudhakar Renewable & Sustainable Energy Reviews, Aug. 24, 2016 815-824.

"The effect of water jetting on spudcan extraction from deep embedment in soft clay", Omid Kohan, Britta Bienen, Christophe Gaudin, and Mark J. Cassidy Ocean Engineering Mar. 15, 2015 90-99.

* cited by examiner

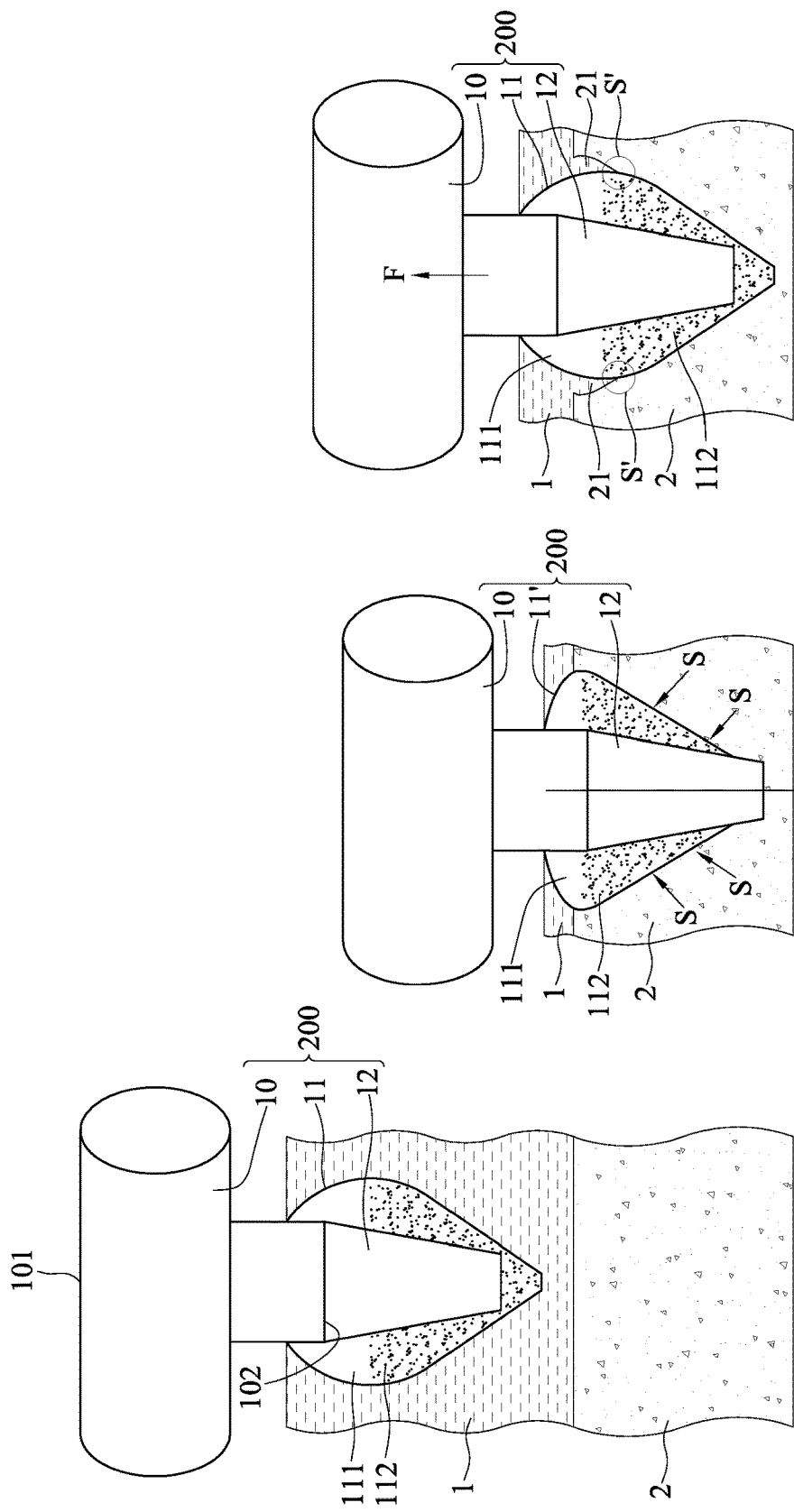

CARRYING DEVICE AND OPERATION METHOD THEREOF

CROSS-REFERENCE TO RELATED APPLICATION

The present disclosure is based on, and claims priority from, Taiwan Application Number 106138964, filed Nov. 10, 2017, the disclosure of which is hereby incorporated by reference herein in its entirety.

TECHNICAL FIELD

The present disclosure relates to carrying devices floating above the surface of water and operation methods thereof, and, more particularly, to a carrying device floating above the surface of water and capable of breaking free or self-detaching from the sediment in the water without external help and an operation method thereof.

BACKGROUND

In areas such as tourism, research and measurement or solar photovoltaic power generation, it is often necessary to set up aquatic floating platforms in lakes, reservoirs and the like. For example, a solar panel can be set up on an aquatic floating platform to generate electricity. In addition to obtaining electricity, the aquatic floating platform can effectively save land resources.

This type of floating platform may fluctuate with the water level. However, as the floating platform faces a drop in the water level, the bottom of the floating platform often gets stuck in the wet soil at the bottom of the water. If there has been a long period of water shortage, the soil will dry up and become hardened. As a result, the floating platform may be firmly stuck in the soil. With a subsequent rise of the water level, the buoyancy provided by the floating platform alone is not enough to allow the floating platform to break free and detach from the consolidated soil without external help, which will cause damage to the things carried on the floating platform when they are immersed in the rising water.

SUMMARY

The present disclosure is to provide a carrying device, which may include: a floating platform configured to float on a surface of a liquid; and at least one flexible unit provided at a bottom side of the floating platform with a cavity formed therein, wherein the cavity is deformed when being subject to a force.

The present disclosure is also to provide an operation method of a carrying device, which may include: placing the aforementioned carrying device on the surface of the liquid; when a level of the liquid decreases and the carrying device gets stuck in a sediment of the liquid, the flexible unit is deformed by the gravity of the carrying device and a stress from the sediment; when the level of the liquid rises, the buoyancy of the carrying device provides another stress for the flexible unit to undergo another deformation for the flexible unit to break free and detach from the sediment.

BRIEF DESCRIPTION OF THE DRAWINGS

FIGS. 2A to 2C are schematic diagrams illustrating a carrying device and its operation method in accordance with another embodiment of the present disclosure;

DETAILED DESCRIPTION OF THE EMBODIMENTS

The present disclosure is described by the following specific embodiments. Those with ordinary skills in the arts can readily understand other advantages and functions of the present disclosure after reading the disclosure of this specification. The present disclosure may also be practiced or applied with other different implementations. Based on different contexts and applications, the various details in this specification can be modified and changed without departing from the spirit of the present disclosure.

Figure 1C:
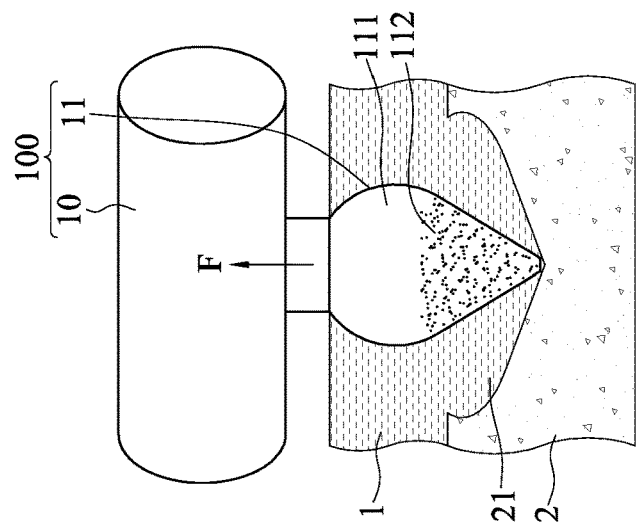
FIGS. 1A to 1C are schematic diagrams illustrating a carrying device and its operation method in accordance with an embodiment of the present disclosure.
Figure 1B:
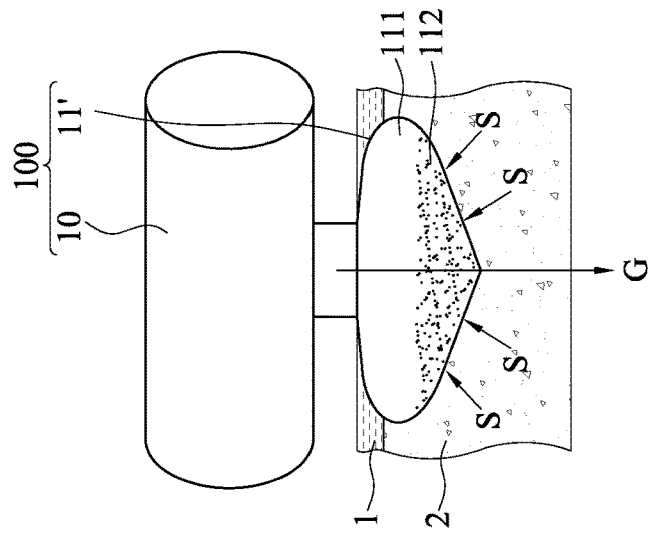
Figure 1A:
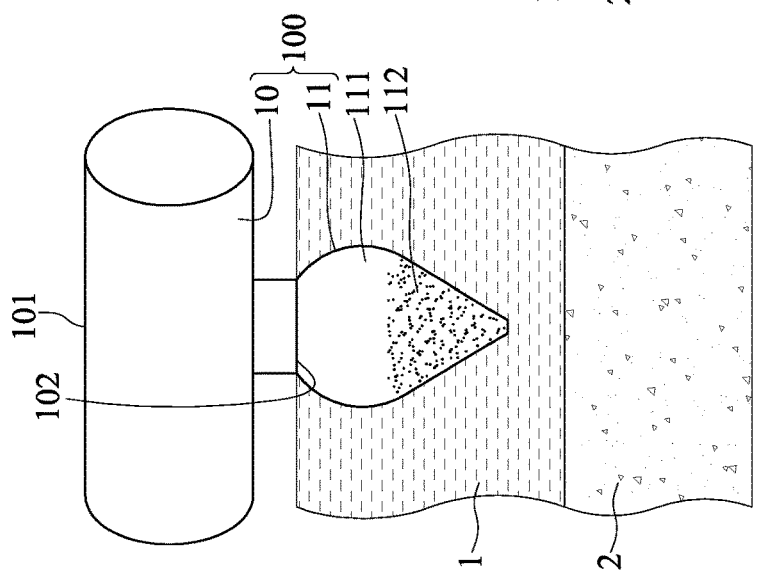

Referring to FIG. 1A, a carrying device 100 proposed by the present disclosure is applicable to carrying things above a liquid level, and may include a floating platform 10 and at least one flexible unit 11. The floating platform 10 has a top side 101 and a bottom side 102 opposite to the top side 101. The flexible unit 11 is provided at the bottom side 102 of the floating platform 10. A cavity 111 is formed within the flexible unit 11. In other words, the floating platform 10 may float on a liquid, such as water 1, and the flexible unit 11 is immersed in the water 1. In addition to application in waters, the carrying device 100 according to the present disclosure can be applicable to other types of liquid that provides certain buoyancy.

In an embodiment, the flexible unit 11 can be made of a flexible material, such as rubber or plastic. Therefore, the flexible unit 11 will be deformed when being subject to a force. When the flexible unit 11 is not subject to any force (i.e., the floating platform 10 floats above the water 1 and the flexible unit 11 experiences the buoyancy of the water when being immersed in it, the flexible unit 11 droops down naturally), it is cone-shaped, but the present disclosure is not limited as such.

In an embodiment, the cavity 111 of the flexible unit 11 is filled with a lubricant 112. This lubricant 112 may be gas, water, oil, wax or a combination thereof. The gas may be, for example, nitrogen or other inert gas; the oil may be, for example, edible vegetable oil such as olive oil or soybean oil, lubricating oil such as machine oil or gear oil, edible animal oil such as lard or butter, butter grease, silicone grease, or the like. The wax may be, but not limited to a solid lubricating wax. In this embodiment, the cavity 111 of the flexible unit 11 can be fully filled with a single type of lubricant 112 or different types of lubricants 112. For example, as shown in FIG. 1A, the cavity 111 is partially filled with oil, while the rest is filled with gas, but the present disclosure is not limited as such. The cavity 111 may be a single cavity or a plurality of separated cavities filled with different or the same lubricant.

FIG. 1B illustrates, in comparison to FIG. 1A, the carrying device 100 being stuck in the sediment of the liquid when the level of liquid drops, for example, the level of the water 1 dropping to a level such that the carrying device 100 is stuck in a soil 2. When the water level keeps dropping, the flexible unit 11 of the carrying device 100 will come into contact with the soil 2. At this time, the flexible unit 11 is caused to deform due to the gravity G of the carrying device 100 and the stress S from the soil 2 (i.e., resulting in the appearance of flexible unit 11' in FIG. 1B). For example, the shape of the cavity 111 shown in FIG. 1A expands laterally from a cone shape to a flatter cone shape. Since the soil 2 is still wet and not consolidated, more of the flexible unit 11' will sink into the soil 2 along with the decreasing of the water level, or even get completely covered by the soil 2.

FIG. 1C illustrates the carrying device 100 having escaped from the soil when the water level rises subsequently after experiencing a drop in the water level as shown in FIG. 1B. When the water level rises, the buoyancy F of the carrying device 100 will cause the flexible unit 11' to have another deformation, and the deformed flexible unit 11 is then able to escape from the soil 2 with the help of the buoyancy F of the carrying device 100. More specifically, when the water level rises, the buoyancy F of the carrying device 100 gradually increases, and stress S' generated by the buoyancy F (e.g., shown in FIG. 2C) is concentrated at the junctions between the flexible unit 11 and the soil 2 (that is, the upper edges of the flexible unit 11 closer to the floating platform 10). As the flexible unit 11 is deformed gradually from the flatter cone shape shown in FIG. 1B to the cone shape shown in FIG. 1C, gaps 21 will appear between the flexible unit 11 and the soil 2. The gaps 21 are then filled with water. Water not only softens the soil 2, but also reduces the friction between the flexible unit 11 and the soil 2. As such, the carrying device 100 is able to cause deformation of the flexible unit 11 merely with its own buoyancy F. The deformed flexible unit 11 then allows the carrying device 100 to break free and detach from the consolidated soil 2 without external help.

FIG. 2A illustrates a carrying device 200 in accordance with another embodiment of the present disclosure. However, only the differences between this embodiment and the previous embodiment are described, while technical features that are the same are omitted to avoid repetition.

The carrying device 200 of FIG. 2A includes a floating platform 10, at least one pile foot 12 and at least one flexible unit 11. The floating platform 10 has a top side 101 and a bottom side 102 opposite to the top side 101. The pile foot 12 is provided at the bottom side 102 of the floating platform 10 and extends downward. The flexible unit 11 is similarly provided at the bottom side 102 of the floating platform 10 and covers the pile foot 12. A cavity 111 is formed in the flexible unit 11. In other words, the floating platform 10 can be floated above water 1, while the flexible unit 11 and the pile foot 12 are immersed in the water 1. The flexible unit 11 can be provided, for example, on the floating platform 10 to completely cover the entire pile foot 12, or at the junction between the pile foot 12 and the floating platform 10 to completely cover the entire pile foot 12, or even on one end of the pile foot 12 closer to the floating platform 10 to cover just part of the pile foot 12. However, the present disclosure is not limited to those described above.

In an embodiment, the flexible unit 11 can be made of a flexible material, such as rubber or plastic. Therefore, the flexible unit 11 will be deformed when being subject to a force. When the flexible unit 11 is not subject to any force, the flexible unit 11 is in the shape of a cone, but the present disclosure is not limited as such.

In an embodiment, the cavity 111 of the flexible unit 11 is filled with a lubricant 112. This lubricant 112 may be gas, water, oil, wax or a combination thereof. The gas may be, for example, nitrogen or other inert gas; the oil may be, for example, edible vegetable oil such as olive oil or soybean oil, lubricating oil such as machine oil or gear oil, edible animal oil such as lard or butter, butter grease, silicone grease, or the like. The wax may be a solid lubricating wax, and the disclosure is not limited thereto. In this embodiment, the cavity 111 of the flexible unit 11 can be fully filled with a single type of lubricant 112 or different types of lubricants 112. For example, as shown in FIG. 1A, the cavity 111 is partially filled with oil, while the rest is filled with gas, but the present disclosure is not limited as such. The cavity 111 may be a single cavity or a plurality of separated cavities filled with different or the same lubricant.

In comparison to FIG. 2A, FIG. 2B illustrates the carrying device 200 being stuck in the soil 2 when the level of the water 1 drops. When the water level keeps dropping, the flexible unit 11 of the carrying device 200 will come into contact with the soil 2. At this time, the flexible unit 11 is caused to deform due to the gravity G of the carrying device 200 and the stress S from the soil 2, such that the bottom end of the flexible unit 11 closer to the soil 2 will lay flat against the pile foot 12 due to the stress S of the soil 2 (the bottom end of the flexible unit 11 contacts with the bottom end of the pile foot 12), and the lubricant 112 in the cavity 111 of the flexible unit 11 will be gradually pushed up. Since the soil 2 is still wet and not consolidated, more and more portions of the flexible unit 11' and the pile foot 12 will sink into the soil 2 along with the decreasing of the water level, or even get completely covered by the soil 2.

FIG. 2C further illustrates the carrying device 200 escaping from the soil 2 when the water level rises subsequently after experiencing a drop in the water level as shown in FIG. 2B. When the water level rises, the buoyancy F of the carrying device 200 will cause the pile foot 12 to move upwards and flexible unit 11' to have another deformation, and the deformed flexible unit 11 and the pile foot 12 are then able to escape from the soil 2 with the help of the buoyancy F of the carrying device 200.

More specifically, when the water level rises, the buoyancy F of the carrying device 200 gradually increases, and stress S' generated by the buoyancy F (e.g., shown in FIG. 2C) is concentrated at the junctions between the flexible unit 11 and the soil 2 (that is, the upper edges of the flexible unit 11 closer to the floating platform 10). Since the buoyancy F of the carrying device 200 pushes the pile foot 12 upwards, the lubricant 112 that was forced to move up in the cavity 111 of the flexible unit 11 in FIG. 2B will now flow down to fill the space created after the pile foot 12 has moved upwards. The downward movement of the lubricant 112 and the upward movement of the pile foot 12 brought about by the buoyancy F of the carrying device 200 will cause deformation of the flexible unit 11 and thus create gaps 21 between the flexible unit 11 and the soil 2. These gaps 21 are then filled with water. Water not only softens the soil 2, but also reduces the friction between the flexible unit 11 and the soil 2. As such, the carrying device 200 is able to cause deformation of the flexible unit 11 and upward movement of the pile foot 12 merely with its own buoyancy F. This allows the carrying device 200 to break free and detach from the consolidated soil 2 without external help.

In an embodiment, the bottom face of the pile foot 12 can be flat or with rounded corners as long as the pile foot 12 does not puncture the flexible unit 11. The present disclosure does not limit the exact implementation of the bottom face of the pile foot 12.

Figure 3:
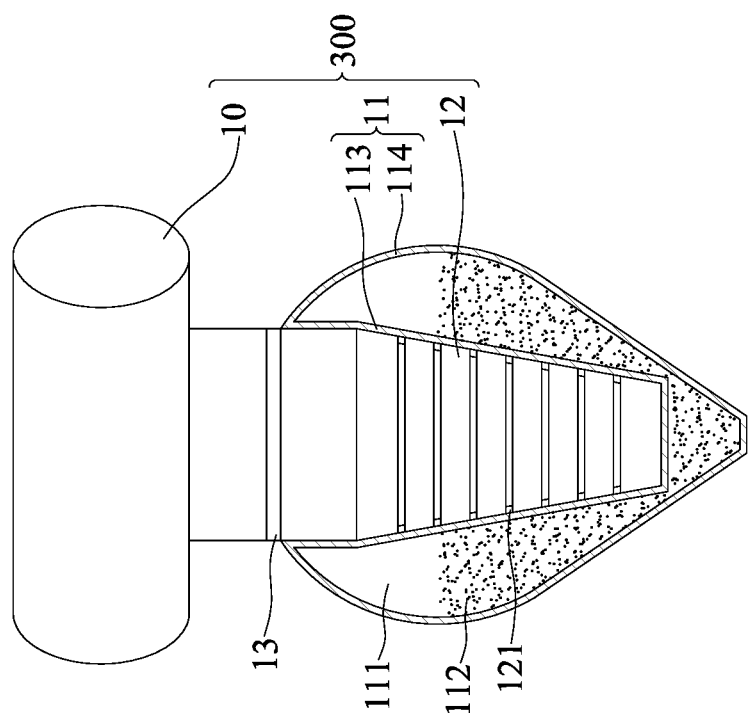
FIG. 3 is a schematic diagram illustrating a carrying device in accordance with still another embodiment of the present disclosure.

Referring to FIG. 3, which is a carrying device 300 in accordance with still another embodiment of the present disclosure. In this embodiment, the flexible unit 11 further includes an inner-layer portion 113 and an outer-layer portion 114. The inner-layer portion 113 is attached to the pile foot 12, and the outer-layer portion 114 is not attached to the pile foot 12 and has a greater area than the inner-layer portion 113. A cavity 111 is formed between the outer-layer portion 114 and the inner-layer portion 113. In an embodiment, the inner-layer portion 113 and the outer-layer portion 114 are integrally formed, but the present disclosure is not limited to this.

In an embodiment, at least one groove 121 is formed on the surface of the pile foot 12 before attachment with the inner-layer portion 113. The groove 121 can be, for example, a spiral groove or continuous saw-tooth groove. The purpose of the groove 121 is to increase the friction between its surface and the inner-layer portion 113 of the flexible unit 11. The present disclosure does not limit the actual form of the groove 121 as long as it increases friction.

In yet another embodiment, the carrying device 300 further includes a fastener 13 for fastening the flexible unit 11 around the pile foot 12 and sealing the cavity 111.

Figure 4:
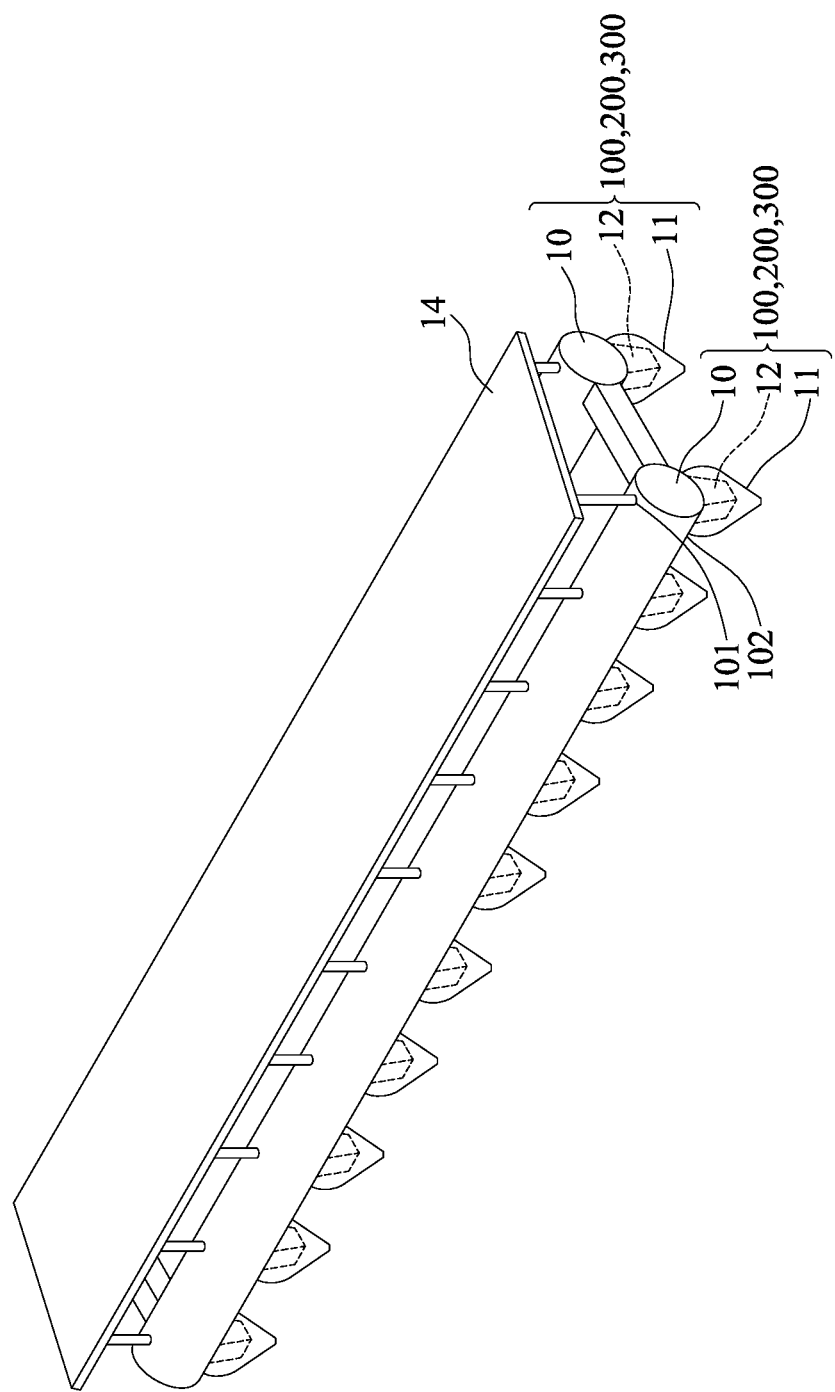
FIG. 4 is a schematic diagram illustrating the carrying device in accordance with the present disclosure in operation.

FIG. 4 is a schematic diagram illustrating the carrying device 100, 200, 300 according to the present disclosure in operation. The floating platform 10 can be formed with two parallel round pipes. For example, the diameter of the pipes can be 0.225 meters, and the length can be 10 meters. The floating platform 10 formed may have a width of 1.5 meters. A plurality of pile feet 12 and corresponding flexible units 11 can be provided at the bottom side 102 of the floating platform 10, and the present disclosure does not limit the number of flexible unit 11 and the pile foot 12. At least one solar panel 14 is provided on the top side 101 of the floating platform 10, and the present disclosure does not limit the number of solar panel 14. The present disclosure also does not limit the floating platform 10 to be formed only with two round pipes. The floating platform 10 may also take the form of a flat board or other shapes.

Figure 5:
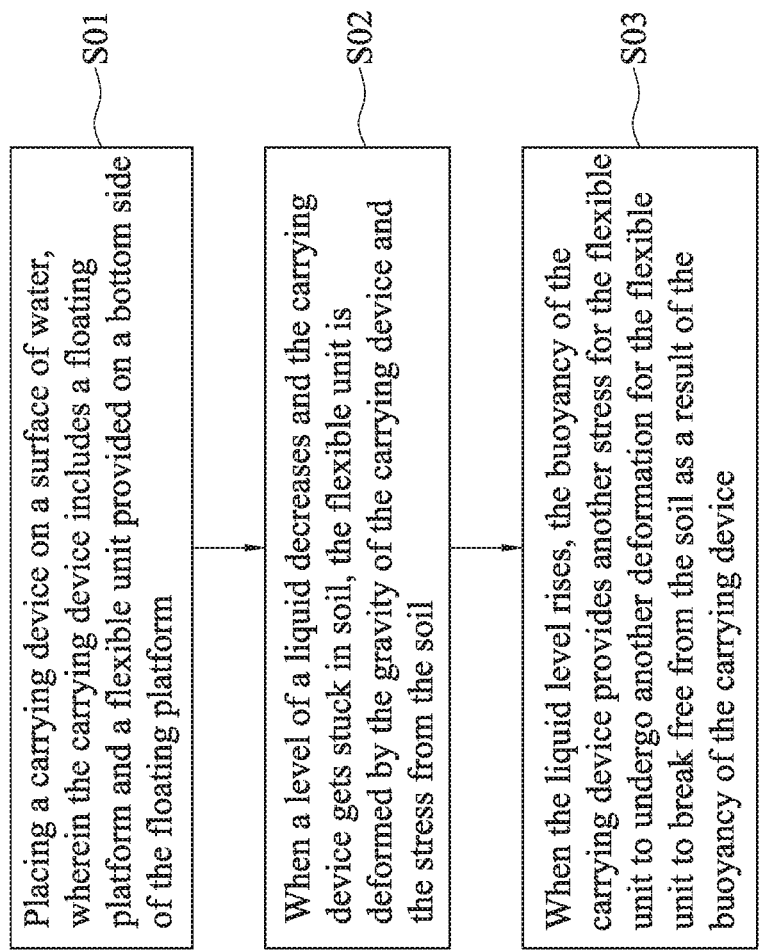
FIG. 5 is a flowchart illustrating an operation method of the carrying device in accordance with the present disclosure.

Referring to FIG. 5 in conjunction with FIGS. 1A-1C or FIGS. 2A-2C, the operation method of the carrying device 100, 200, 300 of the present disclosure includes the following steps of: placing the carrying device 100, 200, 300 in accordance with any one of the aforementioned embodiments on the surface of a liquid (e.g., the surface of water 1), wherein the carrying device 100, 200, 300 includes a floating platform 10 and a flexible unit 11 provided at a bottom side 102 of the floating platform 10 (step S01); when a level of a liquid decreases and the carrying device 100, 200, 300 gets stuck in a sediment (e.g., soil 2) of the liquid, the flexible unit 11 is deformed due to the gravity G of the carrying device 100, 200, 300 and the stress S from the soil 2 (step S02); and when the level of the liquid rises, the buoyancy of the carrying device 100, 200, 300 providing another stress for the flexible unit 11 to undergo another deformation that allows the flexible unit 11 to break free and detach from the soil as a result of the buoyancy F of the carrying device 100, 200, 300 (step S03). In an embodiment, the flexible unit 11 expands laterally due to the gravity G of the carrying device 100, 200, 300 and the stress S from the soil 2 when it comes into contact with the soil 2, and when the level of the liquid rises, the stress S' created by the buoyancy F of the carrying device 100, 200, 300 will be concentrated at the junctions between the flexible unit 11 and the soil 2, gradually forming gaps 21 between the flexible unit 11 and the soil 2 that are then filled with water 1, thereby reducing the friction between the flexible unit 11 and the soil 2.

In the carrying device and the operation method thereof according to the present disclosure, when the carrying device is stuck in the soil due to its own weight and the weight of the object it is bearing and the soil is subsequently hardened, the flexible unit can be deformed as a result of the buoyancy created when the level of water rises. This deformation forces gaps to be created between the flexible unit and the soil, which are then filled with water that not only softens the soil, but also reduces the friction between the flexible unit and the soil. This ultimately results in the carrying device to break free and detach from the soil and once again float on the surface of the liquid without the investment of additional energy. The carrying device and the operation method thereof according to the present disclosure prevent the carrying device and the things it is carrying from being immersed in water, and the carrying device is cheap to manufacture, operate and maintain. In addition, it can be used repetitively.

The above embodiments are only used to illustrate the principles of the present disclosure, and should not be construed as to limit the present disclosure in any way. The above embodiments can be modified by those with ordinary skill in the art without departing from the scope of the present disclosure as defined in the following appended claims.

What is claimed is:

1. A carrying device, comprising:
   a floating platform configured to float on a surface of a liquid;
   at least one flexible unit provided at a bottom side of the floating platform with a cavity formed therein and being immersed in the liquid, wherein the cavity is deformed when being subject to a force; and
   at least one pile foot provided at the bottom side of the floating platform, wherein the at least one pile foot is covered by the at least one flexible unit, and
   wherein the at least one flexible unit includes an inner-layer portion attached to the pile foot and an outer-layer portion free from being attached to the pile foot.

2. The carrying device of claim 1, wherein the outer-layer portion has a greater area than the inner-layer portion.

3. The carrying device of claim 2, wherein the cavity is formed between the inner-layer portion and the outer-layer portion.

4. The carrying device of claim 1, further comprising at least one groove formed on a surface of the pile foot and configured for attachment of the inner-layer portion of the at least one flexible unit thereto.

5. The carrying device of claim 4, wherein the groove is a spiral groove.

6. The carrying device of claim 1, further comprising a fastener configured to fasten the at least one flexible unit around the pile foot and seal the cavity.

7. The carrying device of claim 1, wherein the pile foot has a flat bottom face.

8. The carrying device of claim 1, wherein the pile foot has a bottom face with rounded corners.

9. A method of operating a carrying device, comprising:
   placing the carrying device of claim 1 on the surface of the liquid;
   when a level of the liquid decreases and the carrying device gets stuck in a sediment of the liquid, the at least one flexible unit is deformed by the gravity of the carrying device and a stress from the sediment; and
   when the level of the liquid rises, a buoyancy of the carrying device provides another stress for the at least one flexible unit to undergo another deformation for the at least one flexible unit to break free from the sediment.

10. The method of claim 9, wherein the deformation of the at least one flexible unit caused by the gravity of the carrying device and the stress of the sediment includes lateral expansion.

11. The method of claim 9, wherein the another stress provided by the buoyancy of the carrying device concentrates on a junction between the at least one flexible unit and the sediment to create a gap between the at least one flexible unit and the sediment.

12. The method of claim 11, wherein the gap between the at least one flexible unit and the sediment is configured to be filled with the liquid to reduce friction between the at least one flexible unit and the sediment.

* * * * *